US011469086B2

(12) United States Patent
Kostamo et al.

(10) Patent No.: US 11,469,086 B2
(45) Date of Patent: Oct. 11, 2022

(54) METHOD FOR MANUFACTURING A MULTILAYER RADIATION WINDOW AND A MULTILAYER RADIATION WINDOW

(71) Applicant: AMETEK Finland Oy, Espoo (FI)

(72) Inventors: Jari Kostamo, Turenki (FI); Heikki Sipilä, Espoo (FI)

(73) Assignee: AMETEK Finland Oy, Espoo (FI)

( * ) Notice: Subject to any disclaimer, the term of this patent is extended or adjusted under 35 U.S.C. 154(b) by 25 days.

(21) Appl. No.: 17/053,386

(22) PCT Filed: May 8, 2018

(86) PCT No.: PCT/FI2018/050344
§ 371 (c)(1),
(2) Date: Nov. 6, 2020

(87) PCT Pub. No.: WO2019/215379
PCT Pub. Date: Nov. 14, 2019

(65) Prior Publication Data
US 2021/0233752 A1    Jul. 29, 2021

(51) Int. Cl.
*H01J 47/00*    (2006.01)
*H01J 5/18*    (2006.01)
*H01J 35/18*    (2006.01)

(52) U.S. Cl.
CPC ............ *H01J 47/004* (2013.01); *H01J 5/18* (2013.01); *B32B 2260/025* (2013.01); *B32B 2260/046* (2013.01); *H01J 35/18* (2013.01)

(58) Field of Classification Search
CPC .................................. H01J 47/004; H01J 5/18
See application file for complete search history.

(56) References Cited

U.S. PATENT DOCUMENTS

| 8,494,119 B2 | 7/2013 | Andersson |
| 9,564,252 B2 | 2/2017 | Kostamo et al. |
| 2013/0051535 A1 | 2/2013 | Davis et al. |
| 2017/0154749 A1 | 6/2017 | Torma et al. |

FOREIGN PATENT DOCUMENTS

| WO | 2004025682 A1 | 3/2004 |
| WO | 2011151506 A1 | 12/2011 |
| WO | 2017/168033 A1 | 10/2017 |
| WO | 2017168033 A1 | 10/2017 |

OTHER PUBLICATIONS

Japanese Office Action for JP Application No. 2021-513006 dated Feb. 10, 2022 (17 pages, with English translation).

*Primary Examiner* — Joseph L Williams
(74) *Attorney, Agent, or Firm* — Merchant & Gould P.C.

(57) ABSTRACT

A method is for manufacturing a multilayer radiation window for an X-ray measurement apparatus. The method includes: producing a gas diffusion stop layer made of silicon nitride on a polished surface of a carrier; producing at least one combined layer on an opposite side of the gas diffusion stop layer than the carrier; attaching the combined structure including the carrier, the gas diffusion stop layer, the at least one combined layer to a region around an opening in a support structure with the at least one combined layer facing the support structure; and etching away the carrier. The at least one combined layer includes: a light attenuation layer made of aluminium, and a strengthening layer. A radiation window is manufactured with the method.

15 Claims, 5 Drawing Sheets

METHOD FOR MANUFACTURING A MULTILAYER RADIATION WINDOW AND A MULTILAYER RADIATION WINDOW

PRIORITY

This application is a U.S. national application of the international application number PCT/FI2018/050344 filed on May 8, 2018, the contents of which are incorporated herein by reference.

TECHNICAL FIELD

The invention concerns in general the technical field of thin foils that are used as such or as a part of a radiation window in a measurement apparatus. Especially the invention concerns multi-layer radiation windows.

BACKGROUND

A radiation window is a part of a measurement apparatus that allows a desired part of electromagnetic radiation to pass through. In many cases the radiation window must nevertheless be gastight, in order to seal and protect an enclosure where reduced pressure and/or a particular gas contents prevail. In order to cause as little absorption as possible of the desired radiation, a major part of the radiation window should consist of a thin foil.

Beryllium is known as a very good material for radiation window foils especially in X-ray measurement apparats, because it has a low atomic number (4) and consequently exhibits very low absorption of X-rays. Another characteristic of beryllium that makes it very useful for radiation window foils is its exceptional flexural rigidity. The thinnest beryllium foils that are commercially available for use in radiation windows at the time of writing this description have a thickness in the order of 8 micrometres. According to prior art, the beryllium foil is manufactured from an ingot by rolling. Various coatings can be applied to the beryllium foil for example to enhance its gastightness and corrosion resistance as well as to keep undesired parts of the electromagnetic spectrum (such as visible light) from passing through the foil. An example of known radiation window foils is the DuraBeryllium foil avail-able from Moxtek Inc., Orem, Utah, USA. It comprises an 8 micrometres thick be-ryllium foil coated with a DuraCoat coating. DuraBeryllium, Dura-Coat, and Moxtek are registered trademarks of Moxtek Incorporated.

At the time of writing this description it appears that the rolling technology has met its limits in the sense that it has not been shown capable of manufacturing beryllium foils thinner than 8 micrometres so that they would still be sufficiently gastight. This phenomenon is associated with the relatively large grain size (larger than foil thickness), which results from the grain structure of the original beryllium ingot. Grain boundaries in the beryllium foil tend to cause gas leaks through the foil. Additionally, beryllium has disadvantages as a material because it is toxic. This brings additional requirements for the manufacturing process. Also, the future in the utilization of beryllium is uncertain due to tightening requirements by different national authorities.

One optional material for manufacturing radiation window foils especially in X-ray measurement apparats is boron carbide. The boron carbide is not toxic, and it is environmentally sustainable also in the long term. If the boron carbide layer is thin e.g. less than 0.5 micrometers, its mechanical strength would be too low causing that the layer becomes fragile. However, if the thickness of the boron carbide layer is increased, e.g. more than 2 micrometers, the crystal size inside the boron carbide layer starts to increase causing that the layer becomes fragile. Thus, the mechanical strength of the boron carbide cannot be increased by increasing the thickness of the boron carbide layer.

Thus, there is a need to mitigate the aforementioned problems and develop a solution for providing a thin and gastight radiation window.

SUMMARY

An objective of the invention is to present a multilayer radiation window and a method for manufacturing a multilayer radiation window. Another objective of the invention is that the multilayer radiation window and the method for manufacturing a multilayer radiation window enable manufacturing thin, gastight and mechanically strong radiation window.

The objectives of the invention are reached by a method and a radiation window as defined by the respective independent claims.

According to a first aspect, a method for manufacturing a multilayer radiation window for an X-ray measurement apparatus is provided, wherein the method comprising: producing a gas diffusion stop layer made of silicon nitride on a polished surface of a carrier; producing at least one combined layer on an opposite side of said gas diffusion stop layer than said carrier, wherein the at least one combined layer comprising: a light attenuation layer made of aluminium, and a strengthening layer; attaching the combined structure comprising said carrier, said gas diffusion stop layer, said at least one combined layer to a region around an opening in a support structure with the at least one combined layer facing said support structure; and etching away said carrier.

The strengthening layer may be made of one of the following: carbon filled polymer, boron carbide, diamond like carbon.

The layers of each at least one combined layer may be produced so that the strengthening layer is produced on top of the light attenuation layer.

The method may further comprise producing an attachment layer made of pyrolytic carbon on an opposite side of said gas diffusion stop layer than said carrier so that the at least one combined layer is produced on top of said attachment layer.

The method may further comprise producing a boron carbide layer on an opposite side of said gas diffusion stop layer than said carrier so that the at least one combined layer is produced on top of said boron carbide layer.

Alternatively, the method may further comprise producing a boron carbide layer on an opposite side of said attachment layer than said gas diffusion stop layer so that the at least one combined layer is produced on top of said boron carbide layer.

According to a second aspect, a radiation window for an X-ray measurement apparatus is provided, wherein the radiation window comprising: a support structure that defines an opening, and a multilayer window foil that is attached to the support structure at a region around said opening, wherein said multilayer window foil comprises: at least one combined layer, wherein the at least one combined layer comprises: a light attenuation layer made of aluminium; and a strengthening layer, and a gas diffusion stop layer made of silicon nitride on an opposite side of said at least one combined layer than said support structure.

The strengthening layer may be made of one of the following: carbon filled polymer, boron carbide, diamond like carbon.

In each at least one combined layer the strengthening layer may be on top of the light attenuation layer.

The radiation window may further comprise an attachment layer made of pyrolytic carbon between said gas diffusion stop layer and said at least one combined layer.

The attachment layer may be between 20 to 80 nanometres thick.

The radiation window may further comprise a boron carbide layer between said gas diffusion stop layer and said at least one combined layer.

Alternatively, the radiation window may further comprise a boron carbide layer between said attachment layer (and said at least one combined layer.

The boron carbide layer may be between 0.5 to 2 micrometres thick.

The gas diffusion stop layer may be between 20 to 100 nanometres thick.

The light attenuation layer may be between 80 to 300 nanometres thick.

The strengthening layer may be between 0.25 to 1 micrometres thick.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

In this description we use the following vocabulary. A layer means a quantity of essentially homogeneous material that by its form has much larger dimensions in two mutually orthogonal directions than in the third orthogonal direction. In most cases of interest to the present invention, the dimension of a layer in said third orthogonal direction (also referred to as the thickness of the layer) should be constant, meaning that the layer has uniform thickness. A foil is a structure, the form of which may be characterised in the same way as that of a layer (i.e. much larger dimensions in two mutually orthogonal directions than in the third orthogonal direction) but which is not necessarily homogeneous: for example, a foil may consist of two or more layers placed and/or attached together. A radiation window foil is a foil that has suitable characteristics (low absorption, sufficient gastightness, sufficient mechanical strength etc.) for use in a radiation window of a measurement apparatus. A radiation window is an entity that comprises a piece of radiation window foil attached to an annular support structure so that electromagnetic radiation may pass through an opening defined by the support structure without having to penetrate anything else than said piece of radiation window foil.

Figure 1:
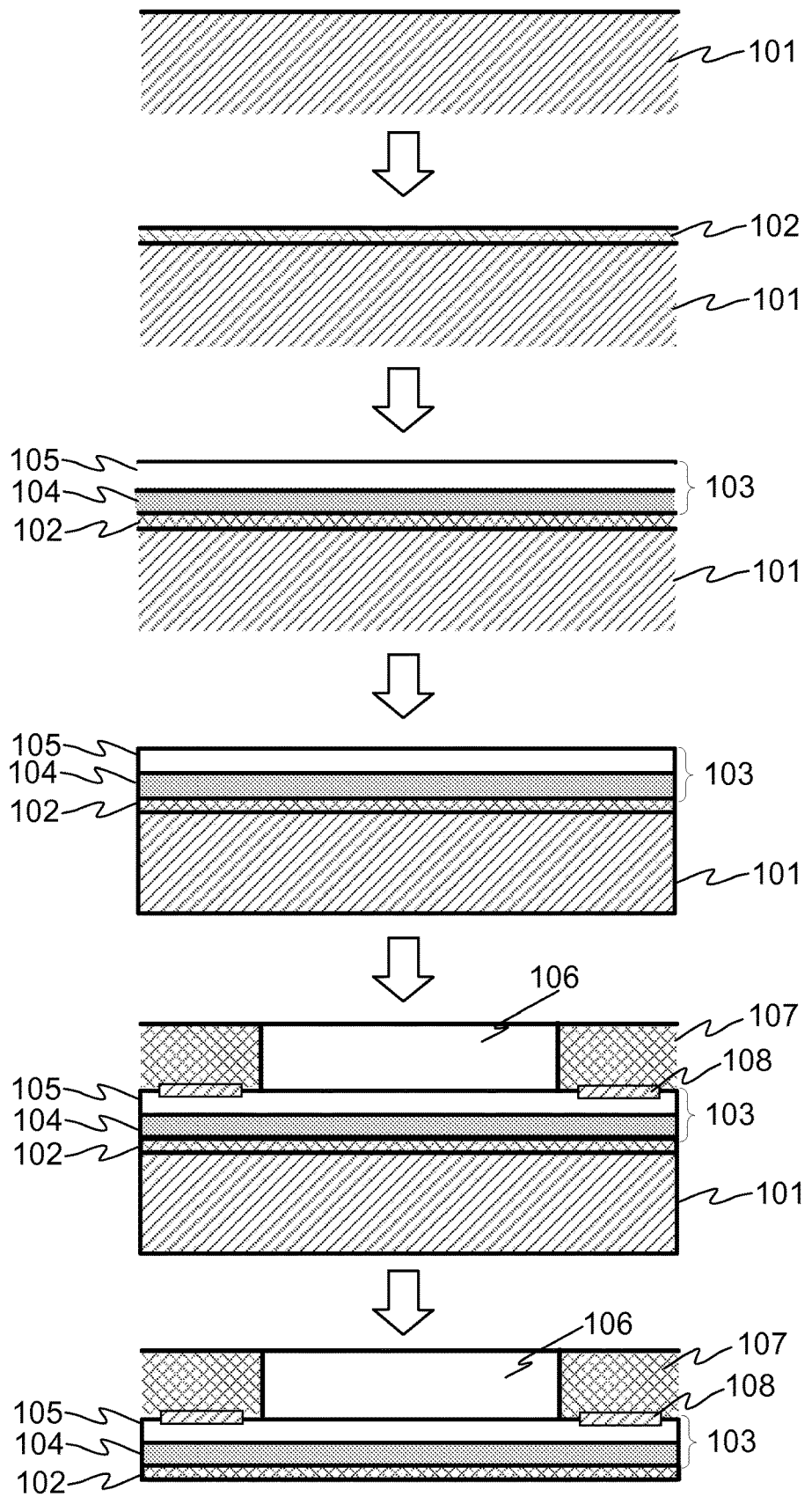
FIG. 1 illustrates schematically a method and a radiation window according to an embodiment of the invention.

FIG. 1 illustrates a workpiece in various steps of a method for manufacturing a radiation window according to an embodiment of the invention. The topmost step illustrates a carrier 101, at least one surface of which has been polished. In FIG. 1, the polished surface faces upwards. The required smoothness of the polished surface is determined by the aim of covering it with an essentially continuous gas diffusion stop layer with uniform thickness in the order of 20 to 100 nanometres. As an example, silicon wafers are routinely polished to achieve rms (root mean square) roughness values in the order of fractions of a nanometre, which is a sufficient for the purposes of the present invention. In addition or as alternative to silicon, the carrier 101 may be manufactured from some other solid material that is etchable with some reasonably common and easily handled etching agent and that can be polished to the required level of smoothness.

In the next step a gas diffusion stop layer 102 is produced on the polished surface of the carrier 101. The main objective of the gas diffusion stop layer 102 is to provide gastight radiation window. Additionally, the gas diffusion stop layer 102 acts as an etch stop layer to keep an etching agent, which in a later process step will appear from below and remove at least part of the carrier 101, from affecting those layers that come on top of the gas diffusion stop layer 102, i.e. the material of the gas diffusion stop layer 102 is impervious for the etching agent. Therefore, the material for the gas diffusion stop layer 102 should be selected so that it will not be affected to any significant degree by an etching agent that works effectively on the material of the carrier 101. Additionally, the material of the gas diffusion stop layer 102 should be applicable for deposition in thin layers (in the order of 20 to 100 nanometres), and it should neither significantly absorb radiation nor produce any awkwardly handled anomalies at the wavelengths of electromagnetic radiation at which the radiation window is to be used. Further advantageous characteristics of a gas diffusion stopping layer 102 comprise corrosion resistance against environmental conditions during the use of an X-ray measurement apparatus, and good adhesion properties for further layers to be deposited thereon. If the carrier 101 is made of silicon, one advantageous material for the gas diffusion stop layer 102 is silicon nitride. The deposition of the gas diffusion stop layer 102 should take place as uniformly as possible, especially avoiding any remaining pinholes in the etch stop layer. Suitable methods for depositing the gas diffusion stop layer 102 include, but are not limited to, chemical vapour deposition and pulsed laser deposition.

In the next step of the method illustrated in FIG. 1 at least one combined layer 103 is produced on an opposite side of said gas diffusion stop layer 102 than said carrier 101. The at least one combined layer 103 comprises a light attenuation layer 104 made of aluminium and a strengthening layer 105. The strengthening layer 105 may be made of one of the following: carbon filled polymer, e.g. carbon fullerene derivative (CFD); boron carbide; diamond like carbon. The strengthening 105 layer made of carbon filled polymer may comprise aromatic polymer and a silicon rich spin-on-glass. The carbon filled polymer may be provided for example by pyrolyzing the polymer at least partly up to a desired stage, i.e. the polymer is not needed to be pyrolyzed completely. According to one example the polymer may be a resist used in the processing of a silicon wafer, e.g. the silicon carrier 101. One advantage of the carbon filled polymer is reduced energy consumption in manufacturing in comparison to materials provided by chemical vapor deposition (CVD), e.g. boron carbide or diamond like carbon. The light attenuation layer 104 of each of the at least one combined layer 103 has a role in blocking out unwanted wavelengths of visible light and stop the growth of the crystal in the strengthening layer 105. The thickness of the light attenuation layer 104 may be between 80 to 300 nanometres. The strengthening layer 105 of each of the at least one combined layer 103 provides mechanical strength for the combined layer and thus also for the whole radiation window. The thickness of the strengthening layer 105 may be between 0.25 to 1 micrometres, preferably the thickness may be 0.5 micrometres. In the example illustrated in FIG. 1 only one combined layer is produced, but in order to improve mechanical and/or pressure strength of the radiation window multiple combined layers may be provided.

Figure 2:
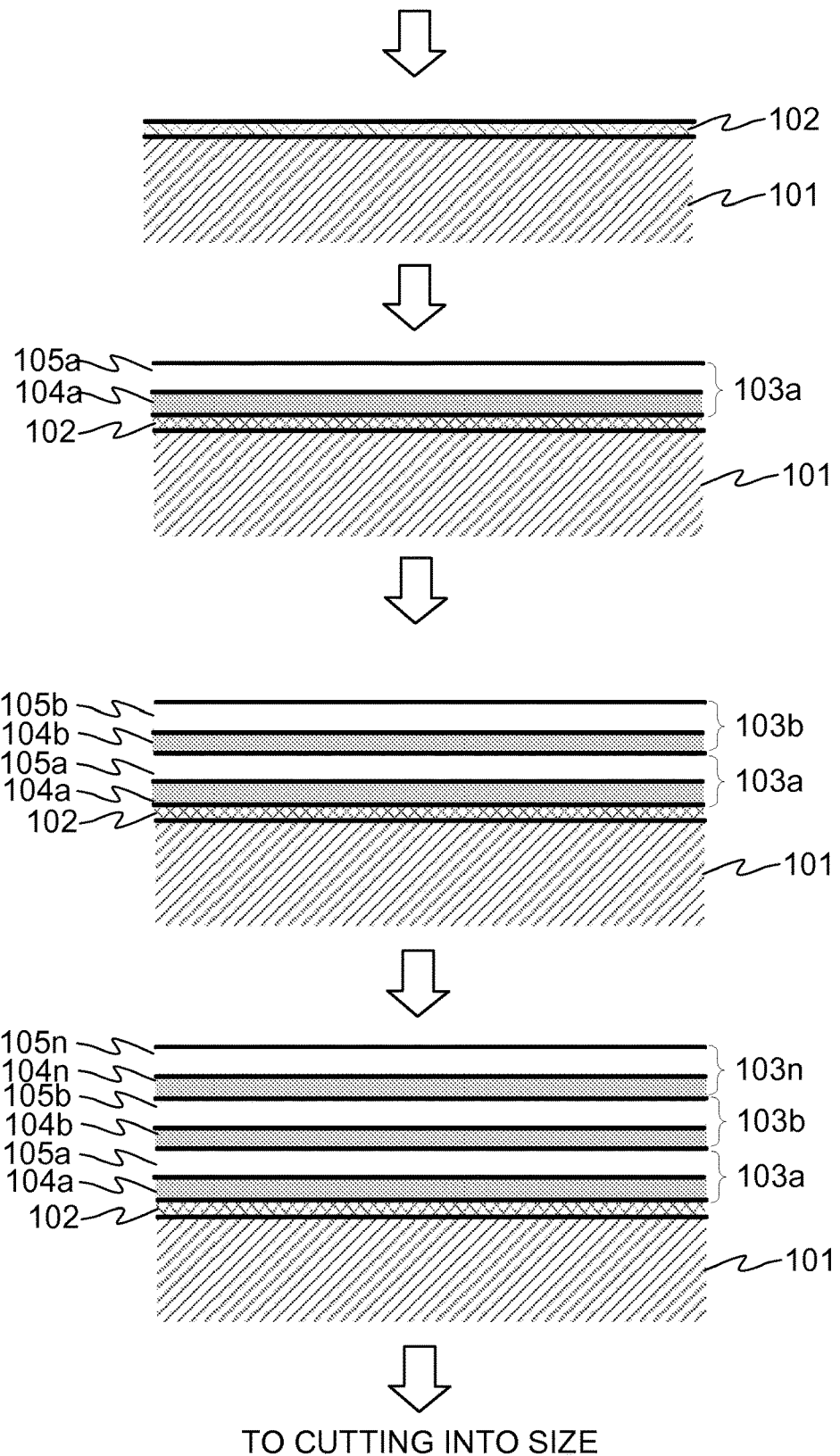
FIG. 2 illustrates schematically a method and a radiation window according to another embodiment of the invention.

In FIG. 2 is schematically illustrated an example of the method according to the invention, wherein three combined layer 103a-103n are produced on an opposite side of said gas diffusion stop layer 102 than said carrier 101. However, the number of the combined layers is not limited to that. Each combined layer 103a-103n comprises a light attenuation layer 104a-104n and a strengthening layer 105a-105n. The layers of each at least one combined layer 103a-103n are produced so that the strengthening layer 105a-105n is produced on top of the light attenuation layer 104a-104n. Furthermore, the multiple combined layers 103a-103n are produced so that the light attenuation layer of the further combined layer is produced on an opposite side of the strengthening layer of the previous combined layer than the light attenuating layer of the previous combined layer. In other words, every other layer of multiple combined layers 103a-103n is a light attenuation layer 104a-104n and every other layer of multiple combined layers is a strengthening layer 105a-105n.

When the radiation window comprises multiple combined layers 103a-103n, all combined layers 103a-103n may comprise a strengthening layer 105a-105n made of the same material, e.g. carbon filled polymer, boron carbide, or diamond like carbon. Alternatively, at least some of the strengthening layers 105a-105n of the combined layers 103a-103n may be made of different material. According to one non-limiting example, first combined layer 103a may comprise a strengthening layer 105a made of carbon filled polymer, second combined layer 103b may comprise a strengthening layer 105b made of boron carbide, and third combined layer 103n may comprise a strengthening layer 105n made of diamond like carbon. According to another non-limiting example, first combined layer 103a may comprise a strengthening layer 105a made of boron carbide, second combined layer 103b may comprise a strengthening layer 105b made of carbon filled polymer, and third combined layer 103n may comprise a strengthening layer 105n made of boron carbide.

In the next step of the method illustrated in FIG. 1 the combined structure of the carrier 101, the gas diffusion stop layer 102 and the at least one combined layer 103 is cut into pieces, so that a piece is suitably sized for use in one radiation window. As an example, the carrier might have originally been a silicon wafer with a diameter of several inches, while the diameter of a piece sufficient for a radiation window may be between 1 and 2 centimetres. On the other hand, the invention does not limit the maximum size of a radiation window to be made. As another example, a radiation window according to an embodiment might have 50 millimetres as the diameter of the foil-covered opening for the radiation to pass through. Cutting the combined structure into pieces at this step of the method is not an essential requirement of the invention, but it is advantageous in the sense that a larger number of completed radiation windows can be very practically manufactured from a single original workpiece.

In the next step of the method illustrated in FIG. 1 the piece of the combined structure comprising the carrier 101, the gas diffusion stop layer 102, and the at least one combined layer 103 is attached to an annular region around an opening 106 in a support structure 107, with the at least one combined layer 103 facing said support structure 105. For the attachment for example soldering or glueing may be used. The cross-section of an exaggeratedly thick layer of glue or solder 108 is schematically shown in FIG. 1. Also otherwise we may note that the illustrated dimensions are not to scale and not comparable to each other; they have been selected only for graphical clarity in the drawings. The fact that the carrier 101 is still present at the step of attaching those parts to the support structure that eventually will constitute the radiation window foil means that handling is easy and there is no need to worry about wrinkling or other kinds of deformation of the radiation window foil at this stage. The illustration of the glue or solder 108 is only schematic in FIG. 1, and it does not mean that a flat layer of glue or solder on the planar surface between the support structure 107 and the at least one layered structure would be the only possible alternative.

The descriptor "annular" should be understood in a wide sense. The invention does not require the support structure to have e.g. a circular form. It is sufficient that the support structure offers some edges and/or a region around the opening, to which the radiation window foil can be attached tightly and extensively enough to keep the radiation window foil in the completed structure securely in place, and—in those applications where gastightness is required to form a gastight seal.

In the last step illustrated in FIG. 1 the carrier 101 has been etched away the, leaving only a radiation window foil comprising the gas diffusion stop layer 102 and the at least one combined layer 103 to cover the opening 106 in the support structure 107. This phase of the method underlines the denomination of the gas diffusion stop layer 102 also as an etch stop layer. Etching is considered to be the most advantageous way of carefully removing the carrier 101 while leaving the other layers intact. As an example, if the carrier 101 is made of silicon and the gas diffusion stop layer 102 is made of silicon nitride, potassium hydroxide (KOH) is one suitable etching agent, especially at a slightly elevated temperature like 70 degrees centigrade. In the etching stage it should be ensured that the etching agent only affects the side of the radiation window foil where the gas diffusion stop layer 102 exists. In doing so the support structure 105 can be utilized: for example, one may turn the structure so that the carrier faces upwards, and attach one end of a tubular shield to outer edges of the support structure 107, so that a "cup" is formed with the carrier-covered radiation window foil forming the bottom of the cup. The tubular shield will keep the etching agent poured into the cup from affecting other parts of the structure than the carrier.

After etching away the carrier, post-processing steps such as rinsing, drying, and testing may be applied according to need.

Figure 3:
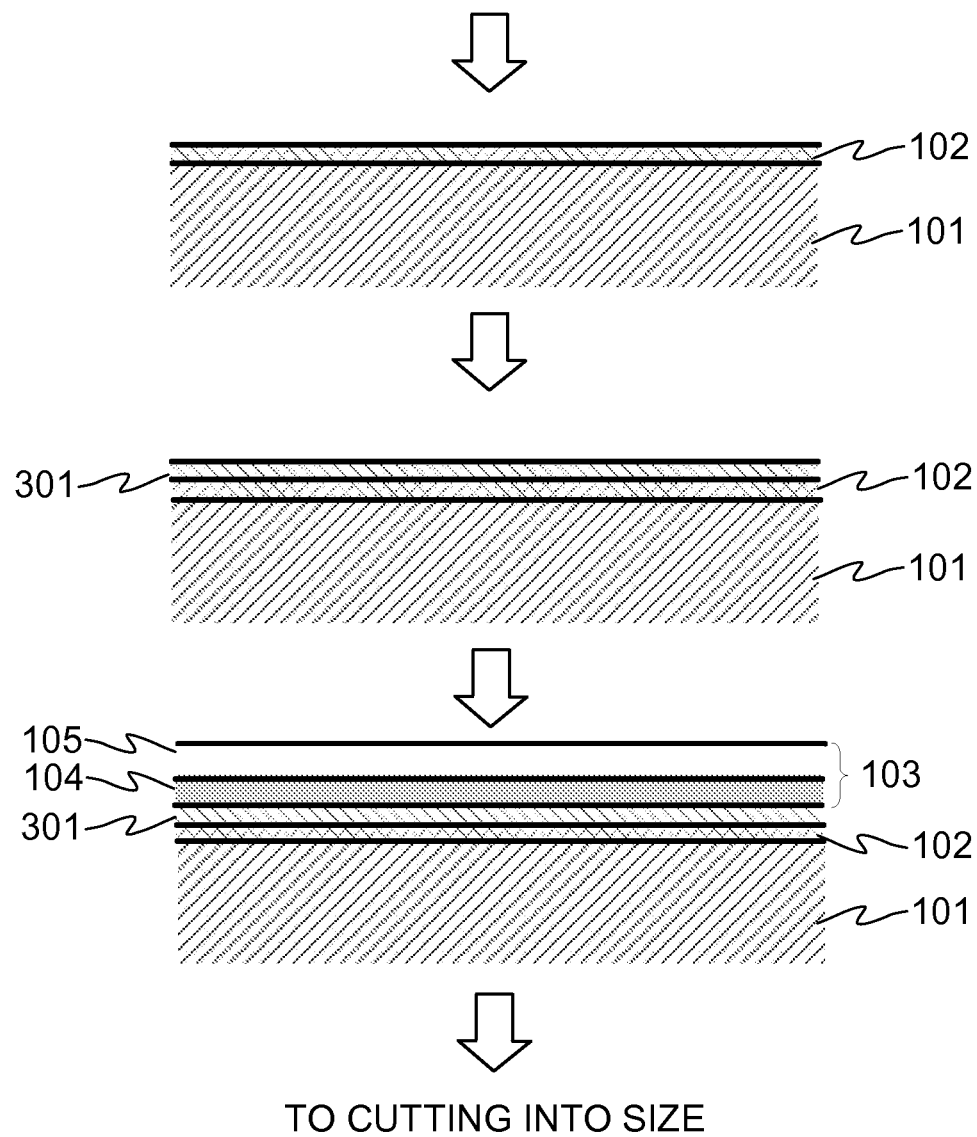
FIG. 3 illustrates schematically a method and a radiation window according to yet another embodiment of the invention.

FIG. 3 illustrates schematically an optional addition to the basic method described above in association with FIGS. 1 and 2. In the topmost illustrated step of FIG. 3, the gas diffusion stop layer 102 has been produced on a polished surface of the carrier 101. As the next step in FIG. 3 an attachment layer 301 made of pyrolytic carbon is produced on an opposite side of said gas diffusion stop layer 102 than said carrier 101. The pyrolytic carbon layer may be provided for example by heating suitable polymer, e.g. phenol-formaldehyde polymer, at substantially high temperature, e.g. approximately 800-1000° C., in vacuum or in controlled atmosphere. The main objective of the attachment layer 301 is to improve the attachment of the following layers. Furthermore, the attachment layer improves at least partly the attenuation of the unwanted wavelengths of visible light. The thickness of the attachment layer 301 may be between 20 to 80 nanometres.

The lowest step illustrated in FIG. 3 represents producing the at least one combined layer 103. Although there is now the attachment layer 301 in between, the at least one combined layer 103 is still on an opposite side of the gas diffusion stop layer 102 than the carrier 101, which is important taken that at least part of the carrier 101 should later be removed in an etching process the effect of which should end at the gas diffusion stop layer 102. From this step the method of manufacturing a radiation window continues to cutting the radiation window foil into size for radiation window(s), like in the fourth step of FIG. 1.

Figure 4A:
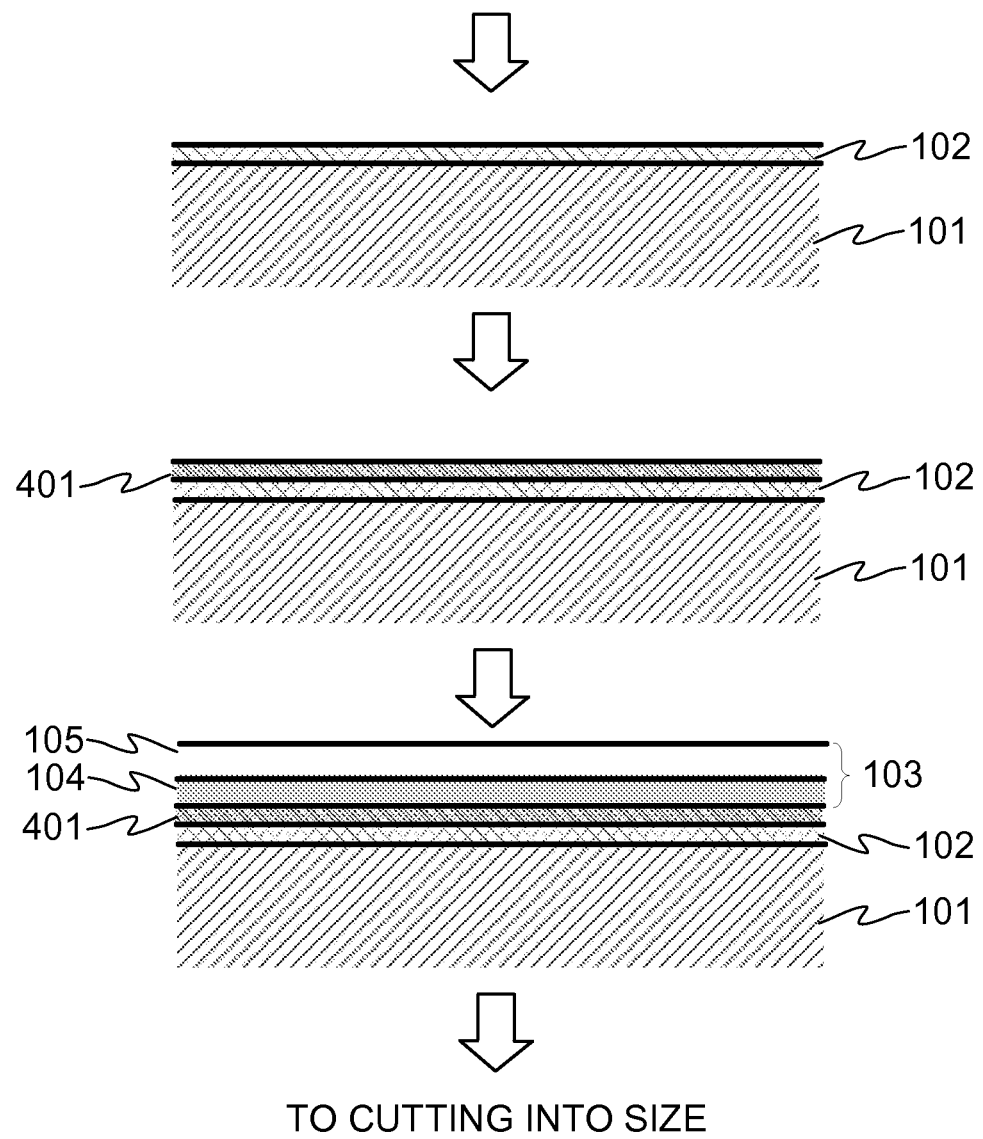
FIG. 4A illustrates schematically a method and a radiation window according to yet another embodiment of the invention.
Figure 4B:
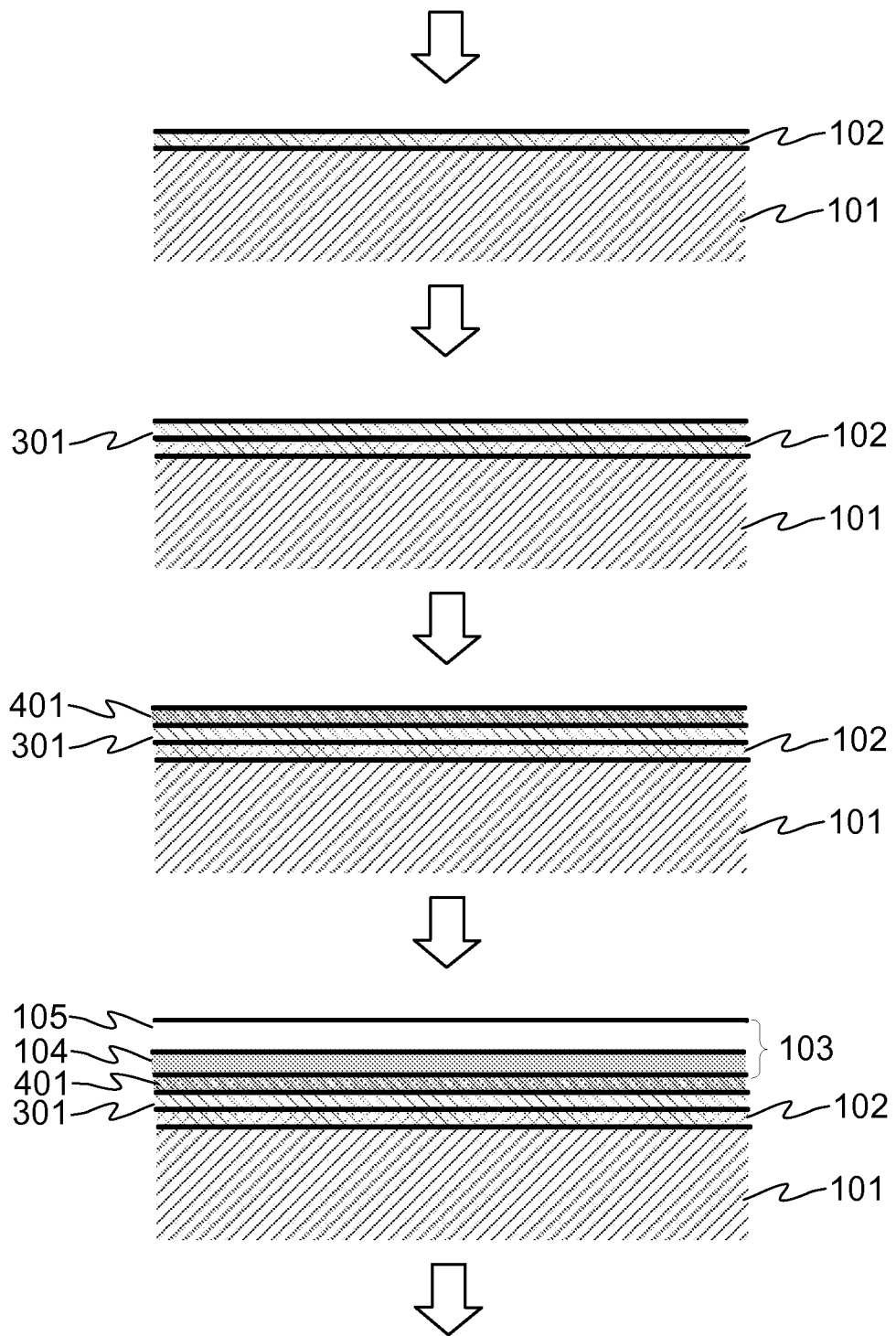
FIG. 4B illustrates schematically a method and a radiation window according to yet another embodiment of the invention.

FIGS. 4A and 4B yet another optional addition that can be added to any of the methods described above. In the topmost illustrated step of FIGS. 4A and 4B, the gas diffusion stop layer 102 has been produced on a polished surface of the carrier 101. As the next step in FIG. 4A a boron carbide layer 401 is produced on an opposite side of said gas diffusion stop layer 102 than said carrier 101. Alternatively, the attachment layer 301 made of pyrolytic carbon may be produced on an opposite side of said gas diffusion stop layer 102 than said carrier 101 as described above in association with FIG. 3 and the boron carbide layer 401 is produced on an opposite side of said attachment layer 301 than gas diffusion stop layer 102 that is illustrated in FIG. 4B. The main objective of the boron carbide layer 401 is to improve the mechanical strength of the radiation window. The thickness of the boron carbide layer 401 may be between 0.5 to 2 micrometres. If the boron carbide layer was thinner, its mechanical strength would be too low and if the boron carbide layer was thicker, its absorption might come too high concerning very sensitive X-ray fluorescence measurements and the boron carbide layer becomes fragile. The boron carbide layer may be produced by using a thin film deposition technique comprising: at least one of the following: sputtering, plasma assisted chemical vapour deposition (CVD), pulsed laser deposition.

The lowest step illustrated in FIGS. 4A and 4B represents producing the at least one combined layer 103. Although there is now the boron carbide layer 401 in between, the at least one combined layer 103 is still on an opposite side of the gas diffusion stop layer 102 than the carrier 101, which is important taken that at least part of the carrier 101 should later be removed in an etching process the effect of which should end at the gas diffusion stop layer 102. From this step the method of manufacturing a radiation window continues to cutting the radiation window foil into size for radiation window(s), like in the fourth step of FIG. 1.

Advantages of the invention described above include the possibility of manufacturing radiation windows where the radiation window foil is very thin and yet gastight and mechanically strong, and causes very little unwanted absorption or spurious responses in a measurement involving X-rays. Additionally, the materials of the radiation window are not toxic and they are environmentally sustainable also in the long term.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for manufacturing a multilayer radiation window for an X-ray measurement apparatus, comprising:
   producing a gas diffusion stop layer made of silicon nitride on a polished surface of a carrier;
   producing a plurality of combined layers on an opposite side of said gas diffusion stop layer than said carrier, wherein each combined layer of the plurality of combined layers comprises:
   a light attenuation layer made of aluminium, and
   a strengthening layer made of one of the following: carbon filled polymer, boron carbide, diamond-like carbon (DLC);
   attaching the combined structure comprising said carrier, said gas diffusion stop layer, said plurality of combined layers to a region around an opening in a support structure with the plurality of combined layers facing said support structure; and
   etching away said carrier.

2. The method according to claim 1, wherein the layers of each combined layer of the plurality of combined layers are produced so that the strengthening layer is produced on top of the light attenuation layer.

3. The method according to claim 1, wherein the method further comprising producing an attachment layer made of pyrolytic carbon on an opposite side of said gas diffusion stop layer than said carrier so that the plurality of combined layers are produced on top of said attachment layer.

4. The method according to claim 3, wherein the method further comprising producing a boron carbide layer on an opposite side of said attachment layer than said gas diffusion stop layer so that the plurality of combined layers are produced on top of said boron carbide layer.

5. The method according to claim 1, wherein the method further comprising producing a boron carbide layer on an opposite side of said gas diffusion stop layer than said carrier so that the plurality of combined layers are produced on top of said boron carbide layer.

6. A radiation window for an X-ray measurement apparatus, comprising:
   a support structure that defines an opening, and
   a multilayer window foil that is attached to the support structure at a region around said opening;
   wherein said multilayer window foil comprises:
   a plurality of combined layers, wherein each combined layer of the plurality of combined layers comprises:

a light attenuation layer made of aluminium, and a strengthening layer made of one of the following: carbon filled polymer, boron carbide, diamond-lie carbon (DLC); and a gas diffusion stop layer made of silicon nitride on an opposite side of said plurality of combined layers than said support structure.

7. The radiation window according to claim 6, wherein in each combined layer of the plurality of combined layers the strengthening layer is on top of the light attenuation layer.

8. The radiation window according to claim 6, wherein the radiation window further comprising an attachment layer made of pyrolytic carbon between said gas diffusion stop layer and said plurality of combined layers.

9. The radiation window according to claim 8, wherein the attachment layer is between 20 to 80 nanometres thick.

10. The radiation window according to claim 8, wherein the radiation window further comprising a boron carbide layer between said attachment layer and said plurality of combined layers.

11. The radiation window according to claim 6, wherein the radiation window further comprising a boron carbide layer between said gas diffusion stop layer and said plurality of combined layers.

12. The radiation window according to claim 11, wherein the boron carbide layer is between 0.5 to 2 micrometres thick.

13. The radiation window according to claim 6, wherein the gas diffusion stop layer is between 20 to 100 nanometres thick.

14. The radiation window according to claim 6, wherein the light attenuation layer is between 80 to 300 nanometres thick.

15. The radiation window according to claim 6, wherein the strengthening layer is between 0.25 to 1 micrometres thick.

* * * * *